United States Patent
Kim et al.

(10) Patent No.: US 10,741,820 B2
(45) Date of Patent: Aug. 11, 2020

(54) RECHARGEABLE BATTERY

(71) Applicant: SAMSUNG SDI CO., LTD., Yongin-si, Gyeonggi-do (KR)

(72) Inventors: Sungyong Kim, Yongin-si (KR); Eun-Young Goh, Yongin-si (KR); Sangin Park, Yongin-si (KR); Jinseon Shin, Yongin-si (KR); Jongki Lee, Yongin-si (KR); Jiwoon Lee, Yongin-si (KR); Jinhyon Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 98 days.

(21) Appl. No.: 15/708,363

(22) Filed: Sep. 19, 2017

(65) Prior Publication Data
US 2018/0083255 A1 Mar. 22, 2018

(30) Foreign Application Priority Data
Sep. 21, 2016 (KR) .......................... 10-2016-0120810

(51) Int. Cl.
*H01M 10/0583* (2010.01)
*H01M 2/26* (2006.01)
*H01M 10/04* (2006.01)

(52) U.S. Cl.
CPC ....... *H01M 2/266* (2013.01); *H01M 10/0459* (2013.01)

(58) Field of Classification Search
CPC .......................... H01M 2/266; H01M 10/0459
See application file for complete search history.

(56) References Cited

U.S. PATENT DOCUMENTS

| 2002/0160263 A1* | 10/2002 | Corrigan | ................. H01M 2/16 429/209 |
|---|---|---|---|
| 2010/0015529 A1 | 1/2010 | Kim et al. | |
| 2014/0050958 A1* | 2/2014 | Kwon | ............... H01M 10/0583 429/94 |

FOREIGN PATENT DOCUMENTS

| KR | 10-0907623 B1 | 7/2009 |
|---|---|---|
| KR | 10-2013-0103202 A | 9/2013 |

* cited by examiner

*Primary Examiner* — James Lee
(74) *Attorney, Agent, or Firm* — Lee IP Law, P.C.

(57) ABSTRACT

A rechargeable battery includes an electrode assembly and first and second lead tabs. The electrode assembly includes at least one separator between a first electrode and a second electrode. The first and second lead tabs are respectively connected to the first and second electrodes and are drawn out of a case. The electrode assembly includes a first assembly having a first length in a first direction and a second assembly having a second length in the first direction shorter than the first length. The first assembly includes at least one first uncoated tab protruding from the first electrode and connected to the first lead tab, and at least one second uncoated tab protruding from the second electrode and connected to the second lead tab. The second assembly includes the at least one second uncoated tab.

18 Claims, 8 Drawing Sheets

RECHARGEABLE BATTERY

CROSS-REFERENCE TO RELATED APPLICATION

Korean Patent Application No. 10-2016-0120810, filed on Sep. 21, 2016, and entitled, "Rechargeable Battery," is incorporated by reference herein in its entirety.

BACKGROUND

1. Field

One or more embodiments described herein relate to a rechargeable battery.

2. Description of the Related Art

Low-capacity rechargeable batteries are used to power mobile phones, notebook computers, camcorders, and other electronic devices. High-capacity rechargeable batteries are used to power motors of hybrid and electric vehicles. One type of high-capacity and high-power rechargeable battery may use a non-aqueous electrolyte with high energy density. A plurality of high-power rechargeable batteries may be connected in series or parallel to form a high-capacity, high-power battery module.

A rechargeable battery has an electrode assembly that includes a separator between positive and negative electrodes. A jellyroll-type of electrode assembly may be changed to a flatter elliptical electrode assembly by interposing a separator between both electrodes, by spiral-winding it to form an elliptical electrode roll, and then pressing it.

In practice, it may not be easy to manufacture rechargeable batteries of different powers and capacities. For example, since electrode active materials coated on current collectors of rechargeable batteries are the same, the manufacturing process of the electrodes should be changed based expected performance requirements and conditions. As a result, manufacturing processability and productivity may deteriorate. Also, frequent changes of rechargeable battery conditions may significantly reduce the efficiency of the manufacturing process. Various attempts have been made to solve this problem but without success.

SUMMARY

In accordance with one or more embodiments, a rechargeable battery includes an electrode assembly including at least one separator between a first electrode and a second electrode; a case to accommodate the electrode assembly; and a first lead tab and a second lead tab respectively electrically connected to the first electrode and the second electrode and drawn out of the case, wherein the electrode assembly includes a first assembly having a first length in a first direction and a second assembly having a second length in the first direction that is shorter than the first length, the first assembly including: at least one first uncoated tab protruding from the first electrode and connected to the first lead tab, and at least one second uncoated tab protruding from the second electrode and connected to the second lead tab, the second assembly includes the at least one second uncoated tab.

The first length and the second length may be in a direction in which the at least one second uncoated tab protrudes. A plurality of first and second uncoated tabs may respectively protrude from the first electrode and the second electrode, may overlap each other, and may be respectively electrically connected to the first lead tab and the second lead tab. The rechargeable battery may include a plurality of separators, wherein, in the electrode assembly, the first electrode has opposite surfaces on which the separators are respectively laminated and are folded in a zigzag pattern to provide an electrode insertion space, and wherein the second electrode is segmented into a plurality of unit electrode plates and are located in the electrode insertion space.

The first electrode and the separator may be integrally formed and extend from the first assembly to the second assembly. A portion of the first electrode including the first assembly may be longer than a portion of the first electrode including the second assembly in the first direction. The unit electrode plate of the second electrode may include a first unit electrode plate inserted into the first assembly, a second unit electrode plate inserted into the second assembly, and the second unit electrode plate is shorter than the first unit electrode plate in the first direction.

The first electrode may include an electrode plate and a plurality of coating portions including an active material on the electrode plate, and the coating portions may be at opposite sides of the electrode plate according to a size of the unit electrode plate and at a position corresponding to the unit electrode plate. The first uncoated tab may protrude from a lateral side of the first electrode and is positioned in a direction crossing to the second uncoated tab. The first uncoated tab may protrude from the first electrode in the first assembly.

In accordance with one or more other embodiments, a method for manufacturing a rechargeable battery includes forming an electrode assembly by: folding a first electrode and a separator of the electrode assembly together in a zigzag pattern; and inserting a plurality of separately segmented unit electrode plates of a second electrode into an electrode insertion space, formed while the first electrode and the separator are folded, wherein the electrode assembly includes a second assembly shorter than a first assembly in a first direction. In the first assembly, a first uncoated tab and a second uncoated tab may respectively protrude from the first electrode and the second electrode, and, in the second assembly, the second uncoated tab may protrude from the second electrode.

In accordance with one or more other embodiments, an apparatus includes a first electrode; a second electrode; a first separator between the first electrode and the second electrode, wherein the first electrode and the separator are folded in a zigzag pattern. The apparatus may include a second separator on a first surface of the first electrode, wherein the first separator is on a second surface of the first electrode opposing the first surface of the first electrode.

The apparatus may include a third electrode; a fourth electrode; and a third separator between the third and fourth electrodes, wherein the third electrode and the fourth electrode may overlap the first electrode and the second electrode, and wherein a size of each of the third electrode and the fourth electrode may be less than a size of each of the first electrode and the second electrode. The apparatus may include a first tab extending from a first electrode assembly including the first electrode, the second electrode, and the first and second separators; and a second tab extending from a second electrode assembly including the third electrode, the fourth electrode, and the third separator, wherein the first tab is longer than the second tab. The first tab and the second tab may be uncoated tabs.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
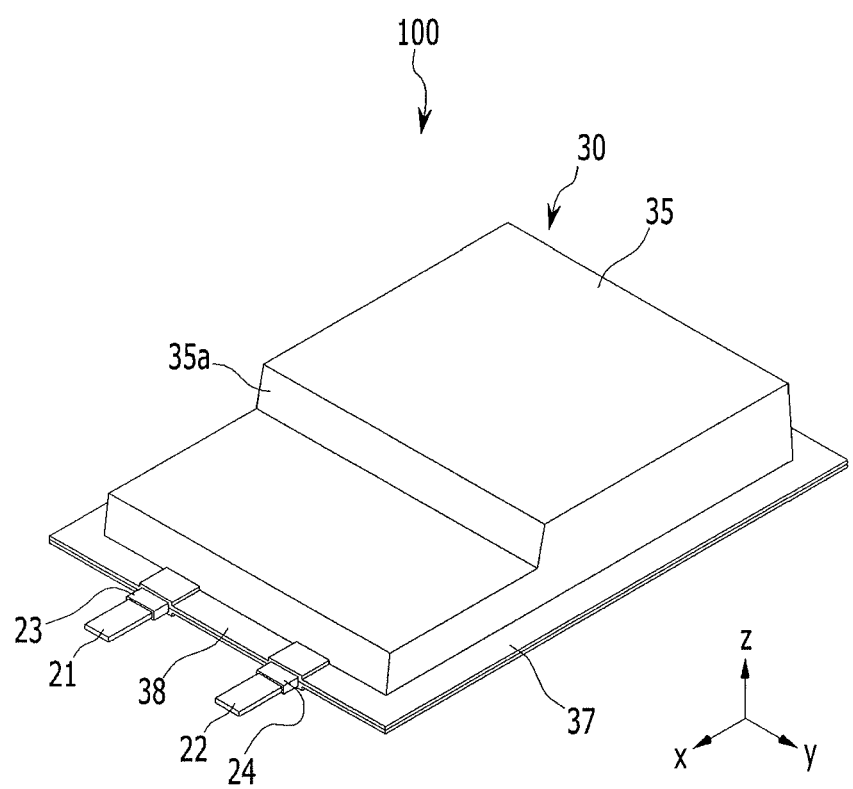
FIG. 1 illustrates an embodiment of a rechargeable battery.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
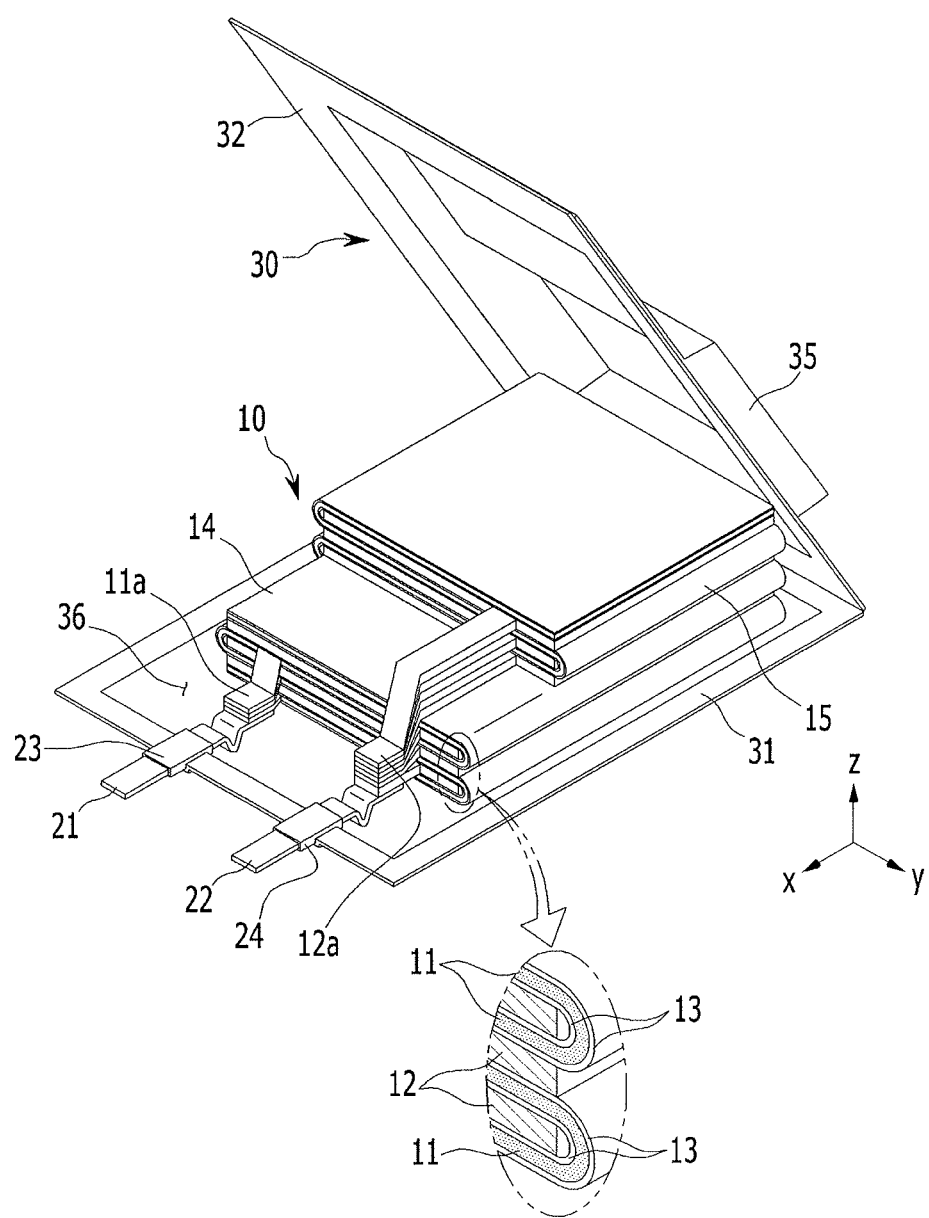
FIG. 2 illustrates an embodiment of a battery case.

FIG. 1 illustrates an embodiment of a rechargeable battery 100, and FIG. 2 illustrates an embodiment of a case of the rechargeable battery shown in FIG. 1.

Referring to FIGS. 1 and 2, the rechargeable battery 100 may include an electrode assembly 10 for performing charging and discharging operations, a case 30 for accommodating the electrode assembly 10, and a first lead tab 21 and a second lead tab 22 that externally protrude. The case 30 includes a receiving portion 35, an edge bonding portion 37, and a terrace space 36. The receiving portion 35 may convexly protrude in order to accommodate the electrode assembly 10. The receiving portions 35 may be at a center of the case 30. The receiving portion 35 is provided with a stepped portion 35a that may correspond, for example, to the shape of the electrode assembly 10.

The case 30 may include a first plate 31 and a second plate 32 that are thermal-bonded. Bonding portions may be at a periphery of the receiving portion 35. The bonding portions may include an upper bonding portion 38 and an edge bonding portion 37. The first lead tab 21 and the second lead tab 22 may be drawn out from the upper bonding portion 38 of the case 30.

In order to prevent a short circuit between the first lead tab 21 and second lead tab 22 and the case 30, insulating tapes 23 and 24 may be respectively attached to the first lead tab 21 and the second lead tab 22 at the upper bonding portion 38.

The edge bonding portion 37 may be formed by thermal-bonding the first plate 31 and the second plate 32 of the case 30 along a length direction of the receiving portion 35. The edge bonding portion 37 and the upper bonding portion 38 surround the receiving portion 35.

In the terrace space 36 of the case 30, a first uncoated tab 11a and a second uncoated tab 12a respectively protruding from a first electrode 11 and a second electrode 12 may be respectively electrically connected to the first lead tab 21 and the second lead tab 22. In one embodiment, a plurality of first uncoated tabs 11a and a plurality of second uncoated tabs 12a may be included.

The electrode assembly 10 includes a separator 13 between a first electrode 11 and a second electrode 12. The electrode assembly 10 may be formed by folding the first electrode 11, the second electrode 12, and the separator 13.

The electrode assembly 10 may include a first assembly 14 having a first length in a first direction and a second assembly 15 having a second length in the first direction. The second length may be shorter than the first length.

The first direction may be a length direction (e.g., an x-axis direction) of the electrode assembly 10. The second direction may be a width direction (e.g., an x-axis direction) of the electrode assembly 10 that is perpendicular to the first direction. The third direction may be a thickness direction (e.g., a z-axis direction) of the electrode assembly 10 that is perpendicular to the first and second directions.

The second assembly 15 is at one side of the first assembly 14, and widths of the first and second assemblies 14 and 15 in the second direction may be the same.

The thickness of the second assembly 15 of the electrode assembly 10 in the third direction may be the same as or smaller than a thickness of the first assembly 14.

The second assembly 15 may be thickly formed by interposing the separator 13 between the first electrode 11 and the second electrode 12, and then by folding this a predetermined number of times according to battery capacities requested by users. By adjusting the thickness of the second assembly 15, rechargeable battery 100 may have various capacities and thus may be easily designed and manufactured. Also, the second assembly 15 and the first assembly 14 are connected to each other and may be integrally manufactured by a folding process, to thereby improve manufacturing processability and productivity.

Figure 3:
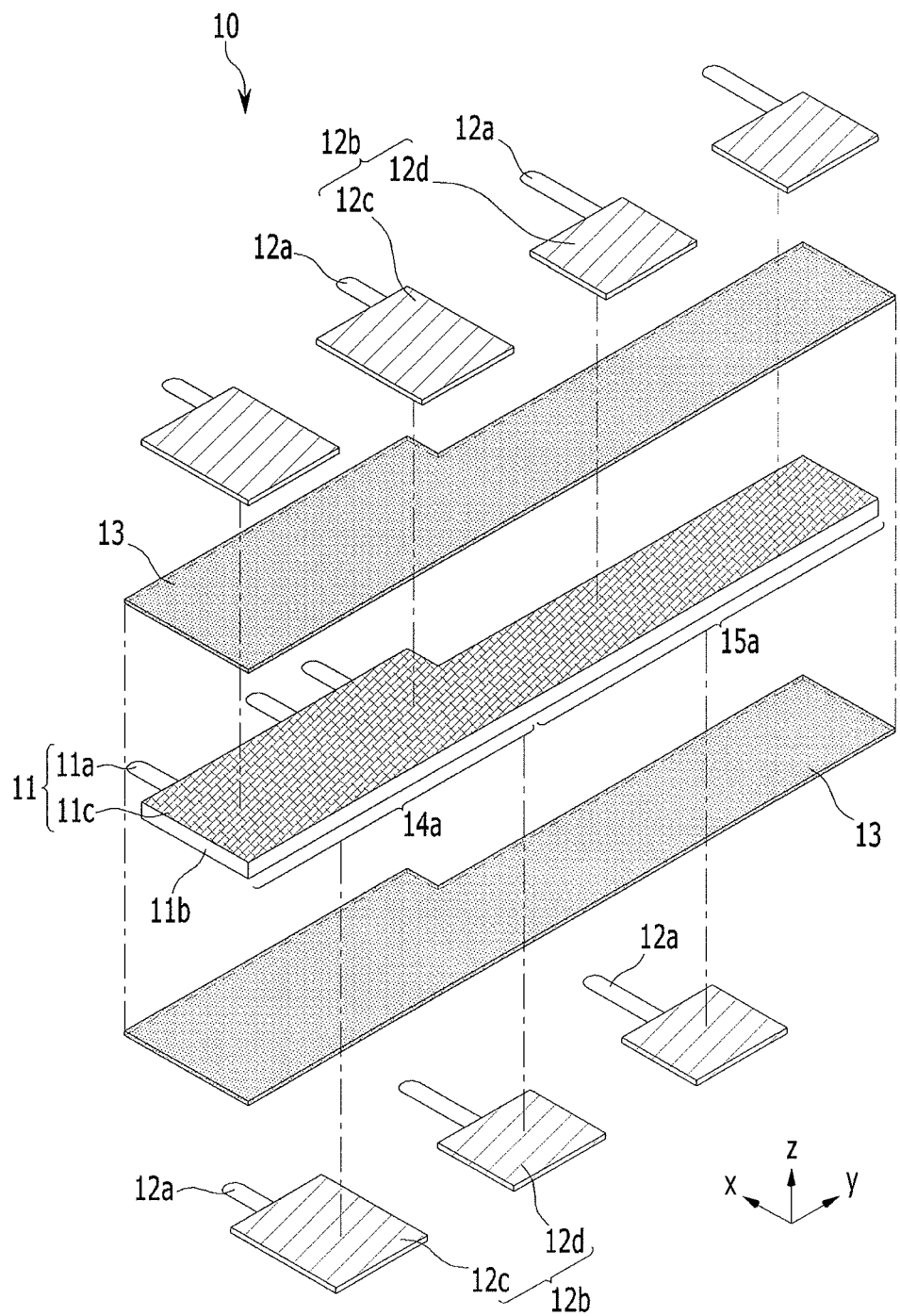
FIG. 3 illustrates an embodiment of an electrode assembly.
Figure 4:
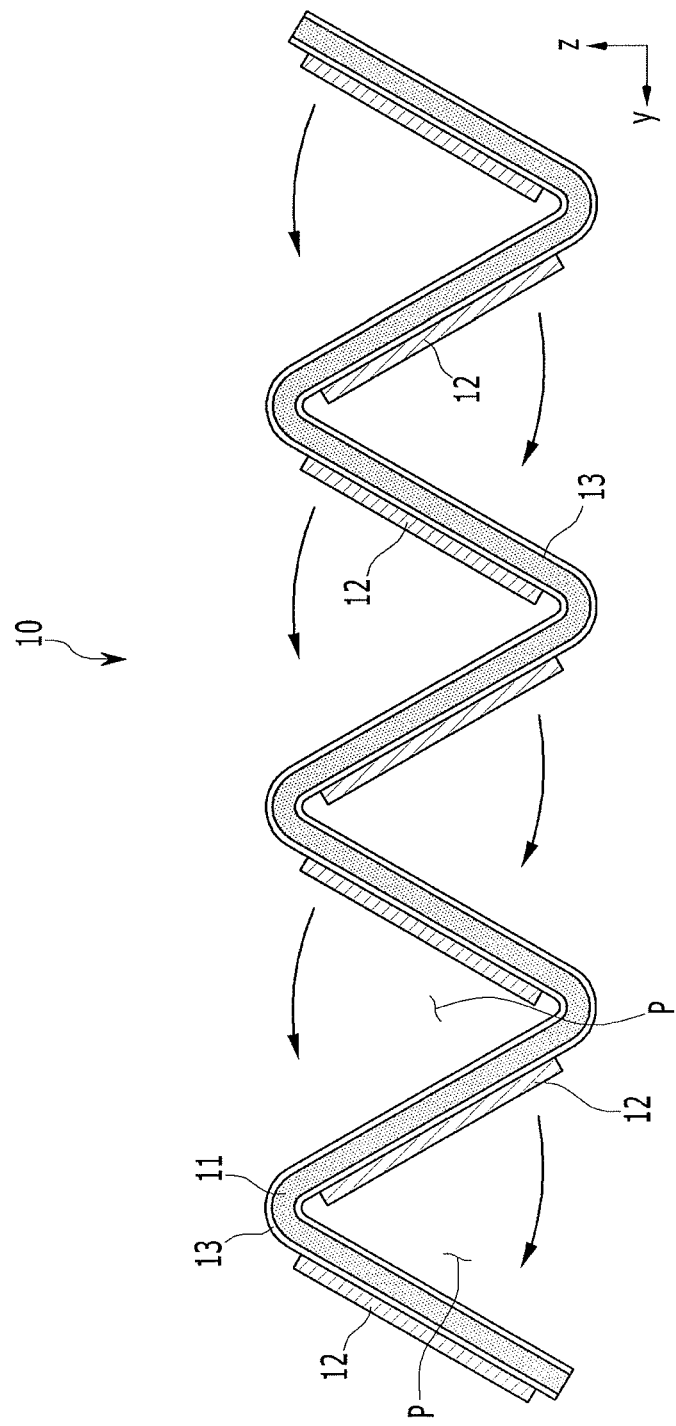
FIG. 4 illustrates an embodiment of electrode assembly with folded sections.

FIG. 3 illustrates an embodiment of an electrode assembly, which, for example, may correspond to an electrode assembly 10 in the rechargeable battery shown in FIG. 2. FIG. 4 illustrates an embodiment of the electrode assembly shown in FIG. 3 with folded steps or sections.

Referring to FIGS. 3 and 4, the electrode assembly 10 includes the separator 13 between the first electrode 11 and the second electrode 12. The first electrode 11 may include coating portions 11c formed by respectively coating an active material on opposite surfaces of an electrode plate 11b and the first uncoated tab 11a on which the active material is not coated and which protrudes from one side of the electrode plate 11b. The first electrode 11 may be, for example, a negative electrode. When the first electrode 11 is a negative electrode, the electrode plate 11b may be made of a material with excellent conductivity, e.g., a thin copper plate. In addition, the active material of the first electrode 11 may be made of a negative active material, e.g., a carbon material mixed with a binder conductive material.

The second electrode 12 may have a different polarity from that of the first electrode 11, e.g., the second electrode 12 may be a positive electrode. The second electrode 12 may include coating portions formed by respectively coating the active material on opposite surfaces of the electrode plate and the second uncoated tab 12a on which the active material is not coated and which protrudes from one side of the electrode plate. In this case, the electrode plate may be made of a material with excellent conductivity, e.g., an aluminum thin plate. The active material may be made of, for example, of a lithium-based oxide mixed with a binder conductive material.

The second electrode 12 may include a plurality of unit electrode plates 12b that are segmented. The unit electrode plate 12b may include a first unit electrode plate 12c at the first assembly 14, and a second unit electrode plate 12d at the second assembly 15 and is smaller than the first unit electrode plate 12c.

The second uncoated tabs 12a protrude from the first unit electrode plate 12c and the second unit electrode plate 12d. The second uncoated tab 12a protruding from the second unit electrode plate 12d may be longer than the second uncoated tab 12a protruding from the first unit electrode plate 12c.

The plurality of second uncoated tabs 12a may overlap each other in the terrace space 36 (e.g., see FIG. 2) of the case 30 and are connected to the second lead tab 22. The second uncoated tabs 12a may protrude from the second unit electrode plate 12d and extend to the terrace space 36.

The separator 13 may be between the first electrode 11 and the second electrode 12. In one embodiment, a plurality of separators 13 may be attached to opposite surfaces of the first electrode 11 through a laminating process. For example, the separators 13 may be attached to opposite surfaces of the first electrode 11 and then cut according to the size of the first electrode 11.

The first electrode 11 and the separator 13 may respectively extend from the first assembly 14 to the second assembly 15 and may be integrally formed. The second electrode 12 may be segmented into unit electrode plates 12b. The second uncoated tab 12a may protrude from each unit electrode plate 12b. In one embodiment, a plurality of first uncoated tabs 11a may protrude from the first electrode 11 for further smoothly charging or discharging a current. In one embodiment, the first electrode 11 may be integrally formed to include a single first uncoated tab 11a.

The first lead tab 21 (e.g., refer to FIG. 2) may be connected to the first uncoated tab 11a protruding from the first electrode 11 in the first assembly 14. When the first electrode 11 is unfolded, the first electrode 11 has a first range 14a occupied by the first assembly 14 and a second range 15a occupied by the second assembly 15.

Widths of the first and second ranges 14a and 15a of the first electrode 11 in the second direction may be different. For example, when the width of the second range 15a is greater than the width of the first range 14a, the thickness of the first assembly 14 in the third direction may be greater than that of the second assembly 15.

The length of the first range 14a in the first direction may be longer than the length of the second range 15a. Accordingly, battery capacity of the first assembly 14 in the first range 14a may be greater than that of the second assembly 15 in the second range 15a.

The second electrode 12 may be segmented into a plurality of unit electrode plates 12b. The size of each unit electrode plate 12b may depend on the size of the first electrode 11 for the second electrode 12 to be positioned on. For example, the first unit electrode plate 12c of the second electrode 12 may be in the first range 14a of the first electrode 11. The second unit electrode plate 12d of the second electrode 12 may be in the second range 15a of the first electrode 11.

The second uncoated tab 12a protrudes from the first unit electrode plate 12c. Accordingly, the first uncoated tab 11a and the second uncoated tab 12a may be formed at the first assembly 14, which may be formed by the first range 14a being folded.

In one embodiment, the electrode assembly 10 may be formed by the first electrode 11 and the separators 13 being folded in a zigzag pattern and by the unit electrode plate 11b of the second electrode 12 being inserted into an electrode insertion space (P) between the separators 13 while being folded.

In the case where the electrode assembly 10 is formed by simultaneously folding the first electrode 11 and the separator 13 in a zigzag pattern, the segmented unit electrode plates 12b may be disposed easier than in the case where the electrode assembly 10 is formed by folding the first electrode 11 and the separator 13 in a predetermined folding direction. As a result, manufacturing processability and productivity may be improved.

Figure 5:
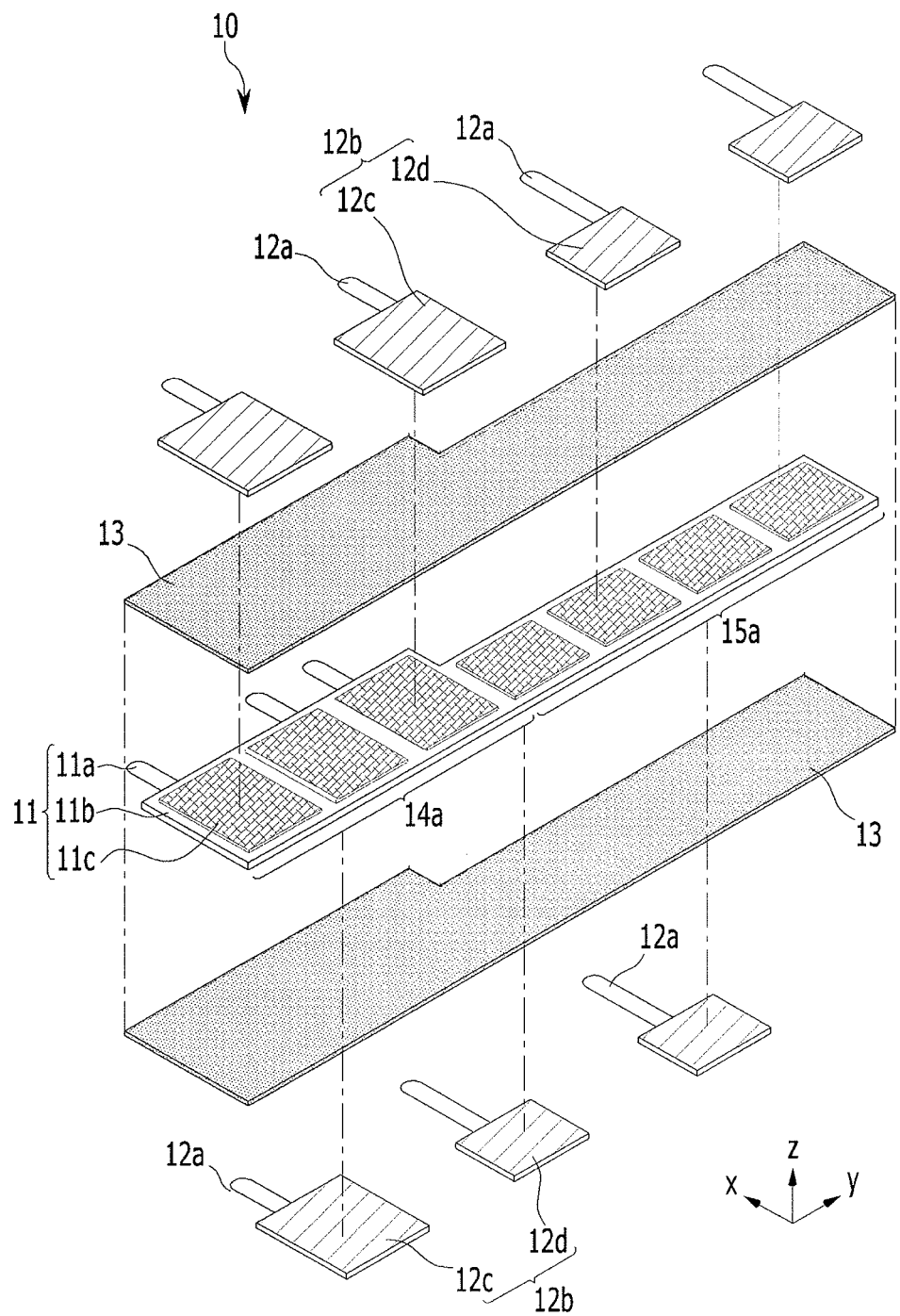
FIG. 5 illustrates another embodiment of an electrode assembly.
Figure 6:
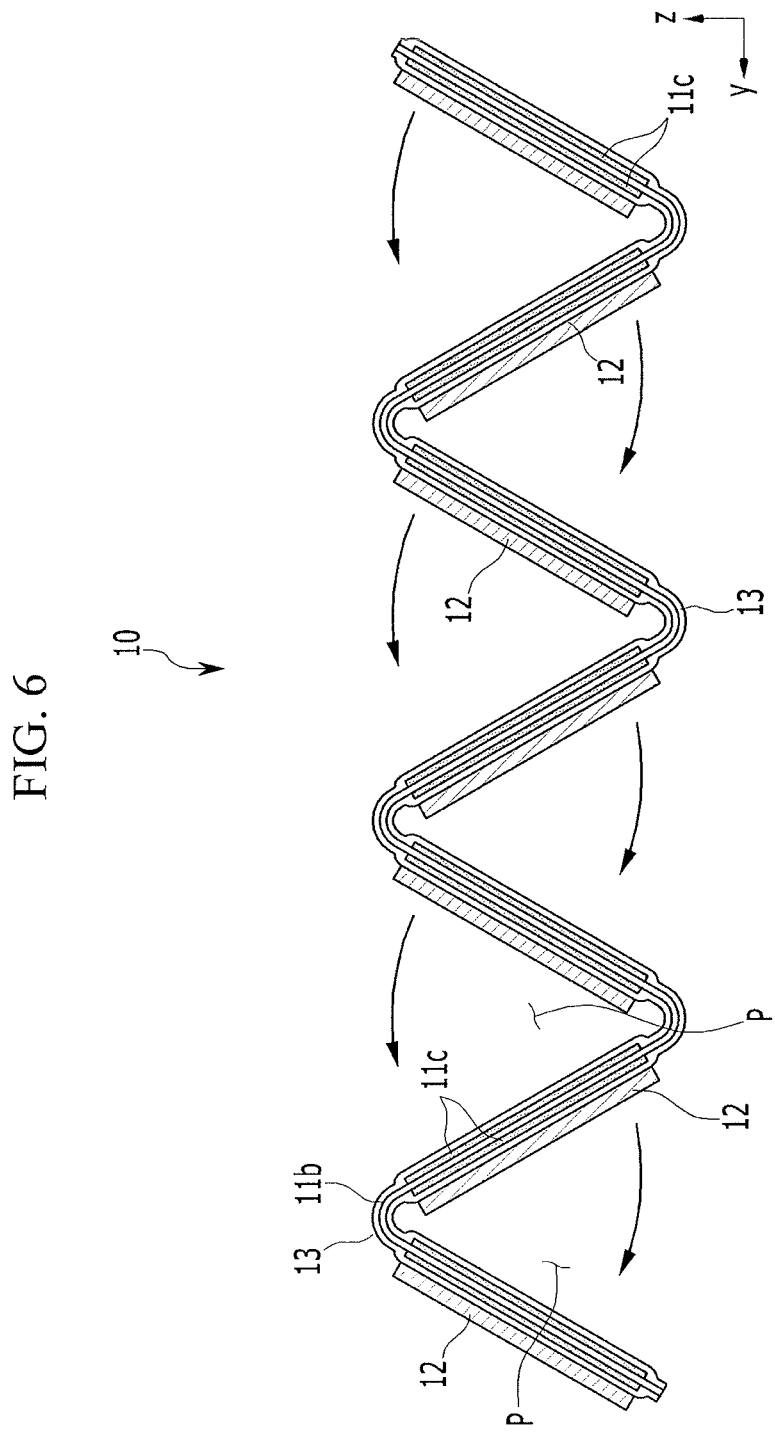
FIG. 6 illustrates another embodiment of an electrode assembly with folded sections.

FIG. 5 illustrates another embodiment of an electrode assembly, which, for example, may be included in any of the embodiments of the rechargeable battery described herein. FIG. 6 illustrates an embodiment of the electrode assembly shown in FIG. 5 with folded sections or steps.

Referring to FIGS. 5 and 6, a rechargeable battery according to this embodiment may have the same structure as the rechargeable battery 100, except for the first electrode 11. The first electrode 11 may include the electrode plate 11b, and a coating portion 11c formed by coating an active material on the electrode plate 11b. The coating portion 11c may have the same size as the unit electrode plate 12b at a position corresponding to the unit electrode plate 12b of the second electrode 12. For example, the active material may be coated on the electrode plate 11b in a pattern according to the unit electrode plate 12b. Thus, waste of active material may be prevented. Also, because the corner thickness is relatively thin when folded, the folding thickness may be reduced. In addition, the active material may be prevented from being broken at a corner portion.

Figure 7:
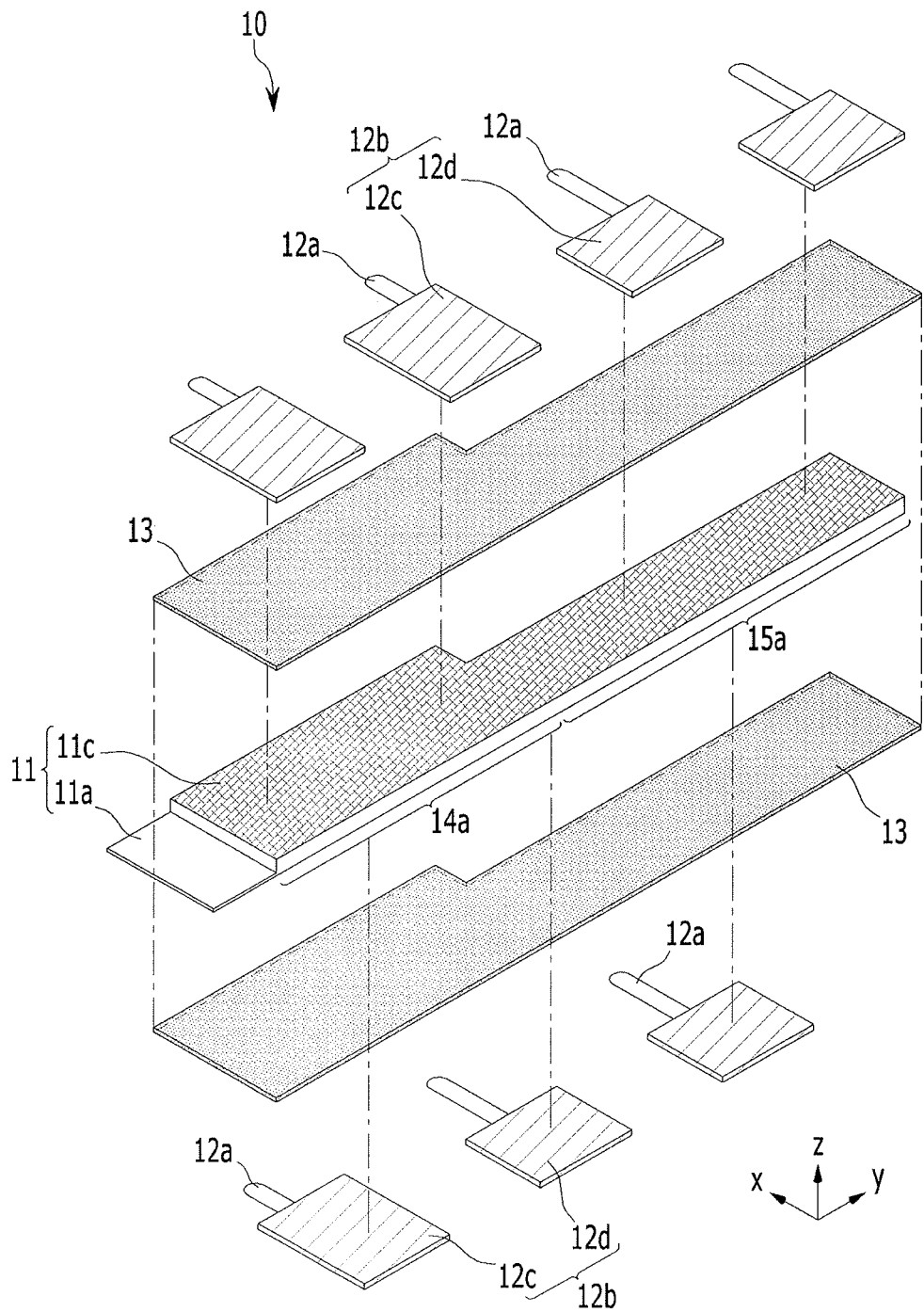
FIG. 7 illustrates another embodiment of an electrode assembly.
Figure 8:
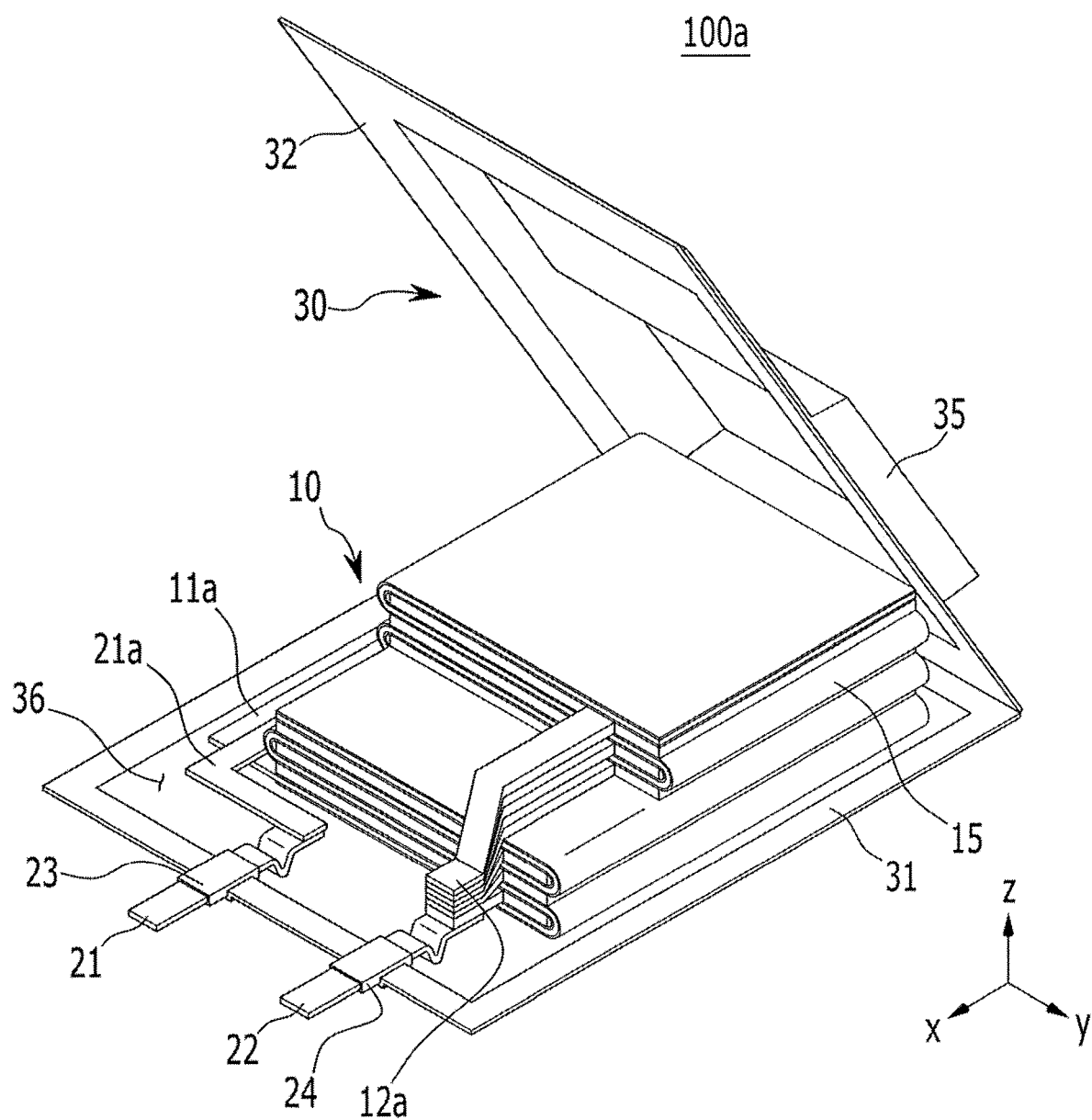
FIG. 8 illustrates another embodiment of a battery case.

FIG. 7 illustrates another embodiment of an electrode assembly 100a of a rechargeable battery, which, for example, may be any of the embodiments of the rechargeable battery described herein. FIG. 8 illustrates an embodiment where the electrode assembly shown in FIG. 7 is folded and accommodated.

Referring to FIGS. 7 and 8, a rechargeable battery 100a has the same structure as rechargeable battery 100 in FIG. 1, except for the first electrode 11. The first uncoated tab 11a may protrude from a lateral side of the first electrode 11. Since the first electrode 11 and the separator 13 are folded in a zigzag pattern, the first uncoated tab 11a may protrude at a folding start or end portion. The first uncoated tab 11a may protrude from a folding end portion of the first assembly 14 or the second assembly 15. For example, the first uncoated tab 11a protruding from the first assembly 14 may be electrically connected to the first lead tab 21. In one embodiment, the first uncoated tab 11a protruding from the end portion of the first assembly 14 and the first uncoated tab 11a protruding from the second assembly overlap each other and are electrically connected to the first lead tab 21.

The first uncoated tab 11a protruding from the lateral side of the first electrode 11 is perpendicular (or crosses) to the second uncoated tab 12a of the second electrode 12. Accordingly, the first lead tab 21 and a bent connecting tab 21a connecting the first uncoated tab 11a may be connected in the case 30. In one embodiment, when there is no connecting tab 21a, the first lead tab 21 and the second lead tab 22 may be drawn out in a direction perpendicular to the outside of the case.

By way of summation and review, by adjusting the thickness of an electrode assembly, a rechargeable battery may have various capacities and thus may be easily designed and manufactured. Also, multiple assemblies may be connected to each other and may be integrally manufactured by a folding process, to thereby improve manufacturing processability and productivity.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A rechargeable battery, comprising:
an electrode assembly including at least one separator between a first electrode and a second electrode;
a case to accommodate the electrode assembly; and
a first lead tab and a second lead tab respectively electrically connected to the first electrode and the second electrode and drawn out of the case,
wherein the electrode assembly includes a first assembly having a first length in a first direction and a second assembly having a second length in the first direction that is shorter than the first length,
wherein the first assembly includes:
a plurality of first uncoated tabs protruding from the first electrode and electrically connected to the first lead tab, the plurality of first uncoated tabs overlapping each other, and
a plurality of second uncoated tabs protruding from the second electrode and electrically connected to the second lead tab, the plurality of second uncoated tabs overlapping each other, and
wherein the second assembly is electrically connected only to the plurality of second uncoated tabs of the first assembly among the pluralities of first and second uncoated tabs of the first assembly, the second assembly including a plurality of third uncoated tabs overlapping each other and being aligned and electrically connected to corresponding ones of the plurality of second uncoated tabs.

2. The rechargeable battery as claimed in claim 1, wherein the first length and the second length are in a direction in which the at least one second uncoated tab protrudes.

3. The rechargeable battery as claimed in claim 1, wherein:
the at least one separator includes at least a first separator and a second separator,
the first electrode has opposite surfaces on which the first and second separators are respectively laminated and are folded in a zigzag pattern to provide an electrode insertion space, and
the second electrode is segmented into a plurality of unit electrode plates located in the electrode insertion space.

4. The rechargeable battery as claimed in claim 3, wherein the first electrode and the first and second separators are integrally formed and extend from the first assembly to the second assembly.

5. The rechargeable battery as claimed in claim 4, wherein a portion of the first electrode including the first assembly is longer than a portion of the first electrode including the second assembly in the first direction.

6. The rechargeable battery as claimed in claim 3, wherein the plurality of unit electrode plates of the second electrode include:
first unit electrode plates inserted into the first assembly,
second unit electrode plates inserted into the second assembly, and
the second unit electrode plates are shorter than the first unit electrode plates in the first direction.

7. The rechargeable battery as claimed in claim 3, wherein:
the first electrode includes an electrode plate and a plurality of coating portions including an active material on the electrode plate, and
the plurality of coating portions are at opposite sides of the electrode plate according to a size of the plurality of unit electrode plates and at a position corresponding to the plurality of unit electrode plates.

8. The rechargeable battery as claimed in claim 3, wherein the at least one first uncoated tab protrudes from a lateral side of the first electrode and is positioned in a direction crossing to the at least one second uncoated tab.

9. The rechargeable battery as claimed in claim 8, wherein the at least one first uncoated tab protrudes from the first electrode in the first assembly.

10. The rechargeable battery as claimed in claim 1, wherein:
an electrode plate of the first electrode is continuous in both the first and second assemblies, a length of the electrode plate in the second assembly being shorter than in the first assembly in the first direction, and
the at least one separator is continuous in both the first and second assemblies and has a same shape as the at least electrode plate of the first electrode, the electrode plate of the first electrode and the at least one separator overlapping each other and being folded together in a zigzag pattern.

11. The rechargeable battery as claimed in claim 10, wherein only a portion of the first electrode in the first assembly among the first and second assemblies is connected to the first lead tab.

12. The rechargeable battery as claimed in claim 10, wherein the second electrode is segmented into a plurality of unit electrode plates spaced apart from each other along the at least one separator, the plurality of unit electrode plates being in both the first and second assemblies, and a length of each unit electrode plate of the plurality of unit electrode plates in the first assembly in the first direction being longer than a length of unit electrode plates of the plurality of unit electrode plates in the second assembly in the first direction.

13. The rechargeable battery as claimed in claim 1, wherein each of the plurality of first uncoated tabs protrudes only from portions of the first assembly among the first and second assemblies.

14. The rechargeable battery as claimed in claim 1, wherein the case has a stepped structure tracing a stepped structure of the first and second assemblies.

15. An apparatus, comprising:
a rechargeable battery, the rechargeable battery including an electrode assembly in a case, and the electrode assembly having:
a first electrode;
a second electrode;
a first separator between the first electrode and the second electrode, wherein the first electrode and the separator are folded in a zigzag pattern; and
a first lead tab and a second lead tab respectively electrically connected to the first electrode and the second electrode and drawn out of the case,
wherein the electrode assembly includes a first assembly and a second assembly, the second assembly being shorter than the first assembly in a first direction,
wherein the first assembly includes:
a plurality of first uncoated tabs protruding from the first electrode and electrically connected to the first lead tab, the plurality of first uncoated tabs overlapping each other, and
a plurality of second uncoated tabs protruding from the second electrode and electrically connected to the second lead tab, the plurality of second uncoated tabs overlapping each other, and
wherein the second assembly is electrically connected only to the plurality of second uncoated tabs of the first assembly among the pluralities of first and second uncoated tabs of the first assembly, the second assembly including a plurality of third uncoated tabs overlapping each other and being aligned and electrically connected to corresponding ones of the plurality of second uncoated tabs.

16. The apparatus as claimed in claim 15, further comprising:
a second separator on a first surface of the first electrode,
wherein the first separator is on a second surface of the first electrode opposing the first surface of the first electrode.

17. The apparatus as claimed in claim 16, further comprising:
a third electrode;
a fourth electrode; and
a third separator between the third and fourth electrodes,
wherein the third electrode and the fourth electrode overlap the first electrode and the second electrode, and wherein a size of each of the third electrode and the fourth electrode is less than a size of each of the first electrode and the second electrode.

18. A method for manufacturing a rechargeable battery, the method comprising:
forming an electrode assembly by:
folding a first electrode and a separator of the electrode assembly together in a zigzag pattern; and
inserting a plurality of separately segmented unit electrode plates of a second electrode into an electrode insertion space, formed while the first electrode and the separator are folded;
positioning the electrode assembly in a case; and
drawing a first lead tab and a second lead tab out of the case, the first and second lead tabs being electrically connected to the first electrode and the second electrode, respectively,
wherein the electrode assembly includes a second assembly shorter than a first assembly in a first direction,
wherein the first assembly includes:
a plurality of first uncoated tabs protruding from the first electrode and electrically connected to the first lead tab, the plurality of first uncoated tabs overlapping each other, and
a plurality of second uncoated tabs protruding from the second electrode and electrically connected to the second lead tab, the plurality of second uncoated tabs overlapping each other, and
wherein the second assembly is electrically connected only to the plurality of second uncoated tabs of the first assembly among the pluralities of first and second uncoated tabs of the first assembly, the second assembly including a plurality of third uncoated tabs overlapping each other and being aligned and electrically connected to corresponding ones of the plurality of second uncoated tabs.

* * * * *